(12) United States Patent
Bringert et al.

(10) Patent No.: US 8,924,219 B1
(45) Date of Patent: Dec. 30, 2014

(54) MULTI HOTWORD ROBUST CONTINUOUS VOICE COMMAND DETECTION IN MOBILE DEVICES

(75) Inventors: Bjorn Erik Bringert, Bath (GB); Hugo Barra, Mountain View, CA (US); Richard Zarek Cohen, London (GB)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/586,975

(22) Filed: Aug. 16, 2012

Related U.S. Application Data

(60) Provisional application No. 61/541,963, filed on Sep. 30, 2011.

(51) Int. Cl.
*G10L 21/00* (2013.01)

(52) U.S. Cl.
USPC .......................................................... 704/275

(58) Field of Classification Search
USPC .......................................................... 704/275
See application file for complete search history.

(56) References Cited

U.S. PATENT DOCUMENTS

| | | | |
|---|---|---|---|
| 5,794,196 A | 8/1998 | Yegnanarayanan et al. | |
| 6,073,097 A | 6/2000 | Gould et al. | |
| 6,167,377 A * | 12/2000 | Gillick et al. | 704/240 |
| 6,233,559 B1 * | 5/2001 | Balakrishnan | 704/275 |
| 6,487,534 B1 * | 11/2002 | Thelen et al. | 704/270 |
| 6,738,743 B2 | 5/2004 | Sharma et al. | |
| 6,993,482 B2 * | 1/2006 | Ahlenius | 704/235 |
| 6,999,930 B1 * | 2/2006 | Roberts et al. | 704/270.1 |
| 7,035,805 B1 | 4/2006 | Miller | |
| 7,058,580 B2 | 6/2006 | Ueyama et al. | |
| 7,120,580 B2 * | 10/2006 | Rao Gadde et al. | 704/233 |
| 7,203,645 B2 | 4/2007 | Pokhariyal et al. | |
| 7,302,383 B2 * | 11/2007 | Valles | 704/9 |
| 7,308,408 B1 | 12/2007 | Stifelman et al. | |
| 7,570,746 B2 | 8/2009 | Takeda et al. | |
| 7,693,720 B2 * | 4/2010 | Kennewick et al. | 704/275 |
| 7,729,904 B2 | 6/2010 | Bennett | |
| 7,917,368 B2 * | 3/2011 | Weinberg et al. | 704/275 |
| 7,933,777 B2 | 4/2011 | Koll | |
| 8,019,608 B2 | 9/2011 | Carraux et al. | |
| 8,126,719 B1 | 2/2012 | Jochumson | |
| 8,165,886 B1 | 4/2012 | Gagnon et al. | |
| 8,224,644 B2 | 7/2012 | Krumel et al. | |
| 8,249,877 B2 | 8/2012 | Koll | |
| 8,345,830 B2 | 1/2013 | Takeda et al. | |
| 2003/0139922 A1 * | 7/2003 | Hoffmann et al. | 704/201 |
| 2003/0182131 A1 * | 9/2003 | Arnold et al. | 704/275 |
| 2004/0010409 A1 | 1/2004 | Ushida et al. | |
| 2007/0061302 A1 * | 3/2007 | Ramer et al. | 707/3 |
| 2008/0221900 A1 * | 9/2008 | Cerra et al. | 704/270.1 |
| 2008/0221902 A1 * | 9/2008 | Cerra et al. | 704/270.1 |

(Continued)

*Primary Examiner* — Michael N Opsasnick
(74) *Attorney, Agent, or Firm* — McDonnell Boehnen Hulbert & Berghoff LLP

(57) ABSTRACT

In a first speech detection mode, a computing device listens for speech that corresponds to one of a plurality of activation phrases or "hotwords" that cause the computing device to recognize further speech input in a second speech detection mode. Each activation phrase is associated with a respective application. During the first speech detection mode, the computing device compares detected speech to the activation phrases to identify any potential matches. In response to identifying a matching activation phrase with a sufficiently high confidence, the computing device invokes the application associated with the matching activation phrase and enters the second speech detection mode. In the second speech detection mode, the computing device listens for speech input related to the invoked application.

20 Claims, 2 Drawing Sheets

(56) References Cited

U.S. PATENT DOCUMENTS

| | | |
|---|---|---|
| 2009/0177461 A1* | 7/2009 | Ehsani et al. ............... 704/2 |
| 2010/0057450 A1 | 3/2010 | Koll |
| 2010/0222090 A1* | 9/2010 | Barnes, Jr. ............... 455/466 |
| 2011/0066634 A1 | 3/2011 | Phillips et al. |
| 2011/0184740 A1 | 7/2011 | Gruenstein et al. |
| 2011/0238415 A1 | 9/2011 | Koll |
| 2012/0179463 A1 | 7/2012 | Newman et al. |
| 2012/0179464 A1 | 7/2012 | Newman et al. |
| 2012/0179469 A1 | 7/2012 | Newman et al. |
| 2012/0179471 A1 | 7/2012 | Newman et al. |

\* cited by examiner

MULTI HOTWORD ROBUST CONTINUOUS VOICE COMMAND DETECTION IN MOBILE DEVICES

CROSS-REFERENCE TO RELATED APPLICATIONS

This patent application claims priority to U.S. Provisional Application No. 61/541,963, filed on Sep. 30, 2011, the contents of which are entirely incorporated herein by reference, as if fully set forth in this application.

BACKGROUND

Unless otherwise indicated herein, the materials described in this section are not prior art to the claims in this application and are not admitted to be prior art by inclusion in this section.

Computing devices, such as mobile devices, are increasingly using speech recognition in order to receive and act in response to spoken input from a user. Typically, a speech input mode must be activated in order for the mobile device to recognize such spoken input. In one approach, the user is able to activate the speech input mode by means of a manual activation, such as by pressing a button on the mobile device. In another approach, a mobile device may operate in a speech detection mode in which the mobile device listens for a specific hotword, such as "Android," to be spoken. The speech input mode may be activated when the hotword is detected. Once the speech input mode has been activated, the mobile device may require the user to provide additional speech input in order to perform a desired action or to launch a desired application. For example, a user may speak the hotword in order activate a speech input mode on a mobile device, and then speak the name of a desired application in order to launch the desired application on the mobile device.

SUMMARY

In a first aspect, a method for a computing device is provided. During a first speech detection mode, the computing device captures first audio, detects first speech in the captured first audio, compares the detected first speech to a plurality of activation phrases to identify any potential matches based on a first language model, wherein each activation phrase is associated with a respective application, and in response to identifying a matching activation phrase with a sufficiently high confidence, invokes the application associated with the matching activation phrase and enters a second speech detection mode. During the second speech detection mode, the computing device captures second audio, detects second speech in the captured second audio, obtains a recognition result of the detected second speech based on a second language model, and provides the recognition result to the invoked application. The first language model is more restricted than the second language model.

In a second aspect, a computer readable medium having stored instructions is provided. The instructions are executable by at least one processor to cause a computing device to perform functions. The functions include, during a first speech detection mode: capturing first audio; detecting first speech in the captured first audio; comparing the detected first speech to a plurality of activation phrases to identify any potential matches based on a first language model, wherein each activation phrase is associated with a respective application; and, in response to identifying a matching activation phrase with a sufficiently high confidence, invoking the application associated with the matching activation phrase and entering a second speech detection mode. The functions further include, during the second speech detection mode: capturing second audio, detecting second speech in the captured second audio, obtaining a recognition result of the detected second speech based on a second language model, and providing the recognition result to the invoked application. The first language model is more restricted than the second language model.

In a third aspect, a computing device is provided. The computing device includes: an audio system for capturing audio; a speech detector for detecting speech in the captured audio; a speech recognizer, wherein the speech recognizer is operable in a first mode in which the speech recognizer is configured to compare speech detected by the speech detector to a plurality of activation phrases, each activation phrase being associated with a respective application, to identify any potential matches, and wherein the speech recognizer is operable in a second mode in which the speech recognizer is configured to recognize speech for at least one application; and an application launcher, wherein the application launcher is configured to, in response to the speech recognizer identifying a matching activation phrase with a sufficiently high confidence, invoke the application associated with the matching activation phrase.

DETAILED DESCRIPTION

Figure 1:
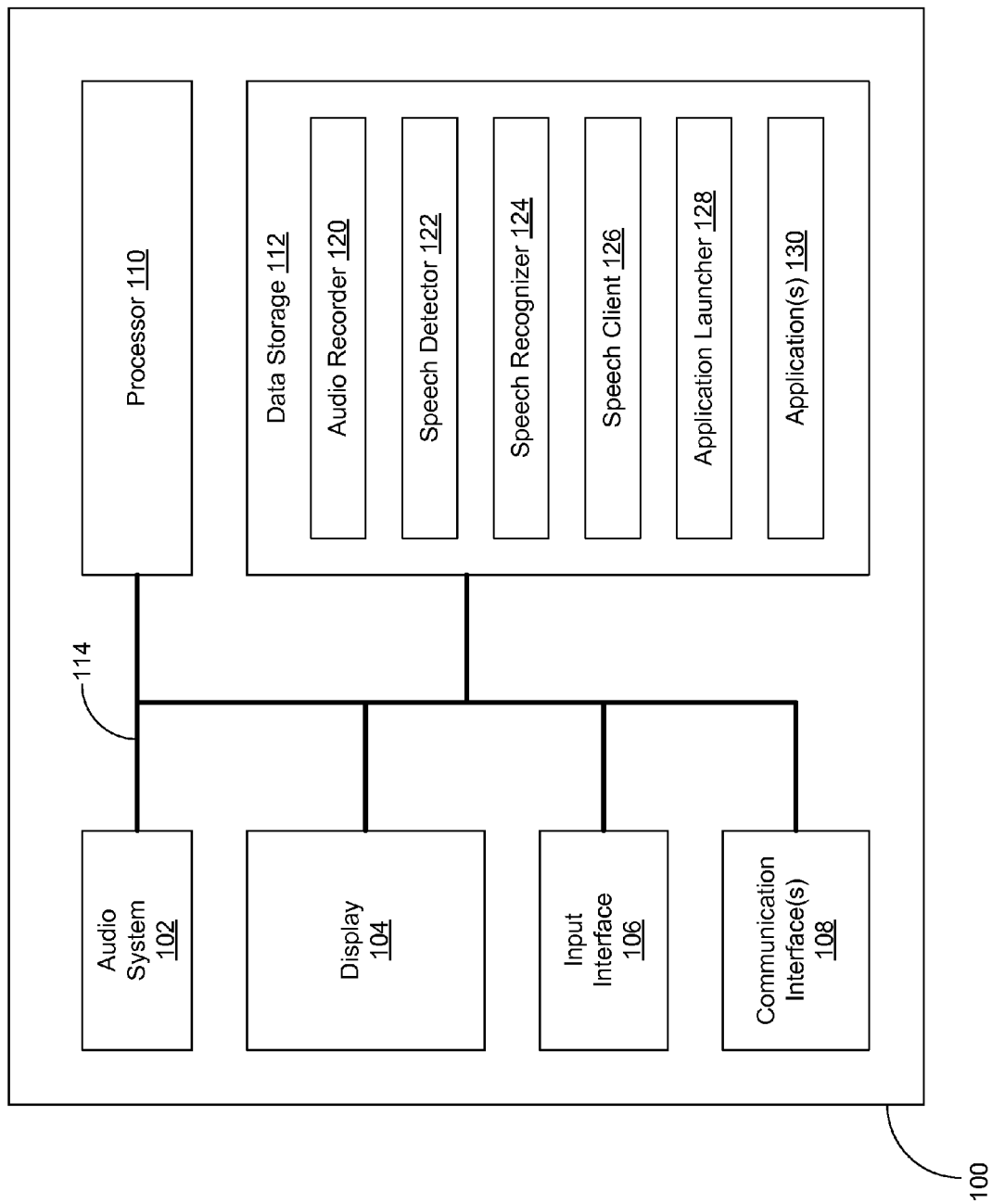
FIG. 1 is block diagram of a computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A computing device may be configured to operate in a first speech detection mode and a second speech detection mode. In the first speech detection mode, the computing device listens for any of a plurality of activation phrases to be spoken. Each activation phrase is associated with a respective application. When an activation phrase is recognized, the computing device may responsively invoke the application associated with the recognized activation phrase and also enter the second speech detection mode. In the second speech detection mode, the computing device listens for speech input related to the invoked application. For example, if the invoked application is a messaging application, then the second speech detection mode may involve listening for speech input that specifies what the user wants to do with the messaging application (e.g., read messages, reply to a message, or send a new message). If the user requests a new message, the second speech detection mode may further involve listening for speech input that specifies the type of message (e.g., e-mail or text), the recipient of the message, the subject of the message, and the body of the message. In addition, the computing device may provide visual and/or spoken prompts to the user regarding the options or fields available in the invoked application.

The first speech detection mode may be described as a "multi hotword" mode, in which any of a plurality of activation phrases or hotwords may be used to activate a speech input mode (i.e., the second speech detection mode). Moreover, the activation phrase may activate the speech input mode for a specific application. In this way, the user experience may can be improved by enabling the user to speak an activation phrase that both activates a speech input mode and launches an application, instead of having the user first speak a hotword and then provide additional spoken to launch an application or initiate an action.

In some embodiments, an activation phrase could be a single word, such as the name of its associated application. For example, a computing device might support three activation phrases: "Messages" to launch a text message application; "Phone" to launch a voice dialing application; and "Map" to launch a navigation application. Alternatively, one or more of the activation phrases could be multiple words. For example, the activation phrase "Text Messages" may be used to launch a text message application. Some or all of the activation phrases could be preset by software in the computing device. However, the activation phrases could also be customizable by the user. For example, instead of using the activation phrase "Map" to launch a navigation application, the user may select an alternative activation phrase, such as "Navigation."

In a first approach, the speech recognizer used by the computing device may be configured to recognize only a small number of activation phrases when operating in the first speech detection mode. For example, the speech recognizer might use a restricted language model during the first speech detection mode, such as a language model that is built from the set of activation phrases supported by the computing device.

In a second approach, the speech recognizer may use a wide coverage language model during the first speech detection mode. However, during the first speech detection mode, a high confidence threshold may be used to determine when there is a match to an activation phrase. Thus, only high-confidence matches would be accepted as matching activation phrases; speech that does not closely match any of the activation phrases would be ignored. This can be achieved by setting a confidence threshold that determines when a speech recognition result is accepted. As such, the confidence threshold could be higher in the first speech detection mode than in the second speech detection mode.

These first and second approaches can beneficially make the "multi hotword" first speech detection mode more robust against false triggering than a more free-form recognition. In addition, by allowing multiple activation phrases to be recognized, the inefficiency of requiring the user to first speak a (potentially meaningless) hotword to start every action, and then provide further speech to identify the desired action, can be avoided.

In some embodiments, the first speech detection mode could be run on the computing device continually or on a default basis. In other embodiments, the computing device may enter the first speech detection mode in response to detecting a predefined trigger. One possible trigger is when the computing device determines that it is docked or is being powered by an external source (such as a recharger). In this state, the potential for consuming processing power and/or battery draining is less of a concern. Thus, the computing device may stay in the first speech detection mode when it is docked or is powered externally.

Another possible trigger is when the computing device receives an asynchronous communication (such as an incoming text message) and provides a notification to the user. When this occurs, the computing device may stay in the first speech detection mode for a predetermined period of time to allow for the possibility that the user may wish to provide speech input based on the notification.

Manual actuation on the computing device could be another or additional trigger for entering the first speech detection mode. The manual actuation could be, for example, the user pressing a button, interacting with a touch screen, making one or more key presses on a keypad, or performing some other form of physical interaction with the computing device's input interface. In response to detecting the manual actuation, the computing device may enter the first speech detection mode and then stay in the first speech detection mode for a predetermined period of time or until the computing device receives further input from the user (e.g., input that indicates that the first speech detection mode should be continued or should be dismissed).

Once one of the activation phrases is recognized, the action corresponding to that phrase is initiated. The user may continue to speak without interruption after the activation phrase, and the computing device may use that speech to further specify the action that is to be taken. While the user is still speaking, the computing device may update a graphical user interface (GUI) to indicate the selected action and to indicate further choices that may be available to fully specify the action.

2. Example Computing Device

FIG. 1 is a block diagram of an example computing device 100. Computing device 100 could be a mobile device, such as a laptop computer, tablet computer, handheld computer, or smartphone. Alternatively, computing device 100 could be a fixed-location device, such as a desktop computer. In this example, computing device 100 is a speech-enabled device. Thus, computing device 100 may include an audio system 102 that is configured to receive audio from a user (e.g., through a microphone) and to convey audio to the user (e.g., through a speaker). The received audio could include speech input from the user. The conveyed audio could include speech prompts to the user.

Computing device 100 may also include a display 104 for displaying visual information to the user. The visual information could include, for example, text, speech, graphics, and/or video. Display 104 may be associated with an input interface 106 for receiving physical input from the user. For example, input interface 106 may include a touch-sensitive surface, a keypad, one or more buttons, or other controls that the user may manipulate by touch (e.g., using a finger or stylus) to provide input to computing device 100. In one example, input interface 106 includes a touch-sensitive surface that overlays display 104.

Computing device 100 may also include one or more communication interface(s) 108 for communicating with external devices. Communication interface(s) 108 may include one or more wireless interfaces for communicating with external devices through one or more wireless networks. Such wireless networks may include, for example, 3G wireless networks (e.g., using CDMA, EVDO, or GSM), 4G wireless networks (e.g., using WiMAX or LTE), or wireless local area networks (e.g., using WiFi). In other examples, communication interface(s) 108 may access a communication network using Bluetooth®, Zibee®, infrared, or other form of short-range wireless communication. Instead of or in addition to wireless communication, communication interface(s) 108 may be able to access a communication network using one or more wireline interfaces (e.g., Ethernet). The network communications supported by communication interface(s) 108 could include, for example, packet-based communications through the Internet or other packet-switched network.

The functioning of computing device 100 may be controlled by one or more processors, exemplified in FIG. 1 by processor 110. More particularly, the one or more processors may execute instructions stored in a non-transitory computer readable medium to cause computing device 100 to perform functions. In this regard, FIG. 1 shows processor 110 coupled to data storage 112 through a bus 114. Processor 110 may also be coupled to audio system 102, display 104, input interface 106, and communication interface(s) 108 through bus 114.

Data storage 112 may include, for example, random access memory (RAM), read-only memory (ROM), flash memory, cache memory, and/or other forms of non-transitory computer readable media. Data storage 112 may store data as well as instructions that are executable by processor 110.

In one example, the instructions stored in data storage 112 include instructions that, when executed by processor 110, provide the functions of an audio recorder 120, a speech detector 122, a speech recognizer 124, a speech client 126, an application launcher 128, and one or more applications(s) 130. The audio recorder 120 may be configured to capture audio received by audio system 102. The speech detector 122 may be configured to detect speech in the captured audio. The speech recognizer 124 may be configured to return a speech recognition result (which may include, for example, text and/or recognized voice commands) in response to receiving audio input. As described in more detail below, speech recognizer may be configured to operate in a first mode (e.g., in order to detect activation phrases) and in a second mode (e.g., in order to recognize speech for at least one application).

The speech client 126 may be configured to communicate with a network speech recognizer, including forwarding audio to the network speech recognizer and receiving from the network speech recognizer a speech recognition result for the audio. In some embodiments, speech recognizer 124 and the network speech recognizer (through speech client 126) may be used to recognize speech in parallel. Thus, speech recognition results from either recognizer could be used. In other embodiments, speech recognizer 124 might be used as a default recognizer, with the network speech recognizer being used through speech client 126 only under certain conditions, if at all. Alternatively, the network speech recognizer could be used (through speech client 126) as the default speech recognizer.

The application launcher 128 may be configured to launch one or more of application(s) 130 in response to speech recognition results provided by speech recognizer 124. Application(s) 130 may include one or more applications for e-mail, text messaging, social networking, telephone communications, games, playing music, etc.

Although FIG. 1 shows audio recorder 120, speech detector 122, embedded speech recognizer 124, speech client 126, application launcher 128, and applications(s) 130 as being implemented through software, some or all of these functions could be implemented as hardware and/or firmware. It is also to be understood that the division of functions among modules 120-130 shown in FIG. 1 and described above is only one example; the functions of modules 120-130 could be combined or divided in other ways.

3. Example Methods

Figure 2:
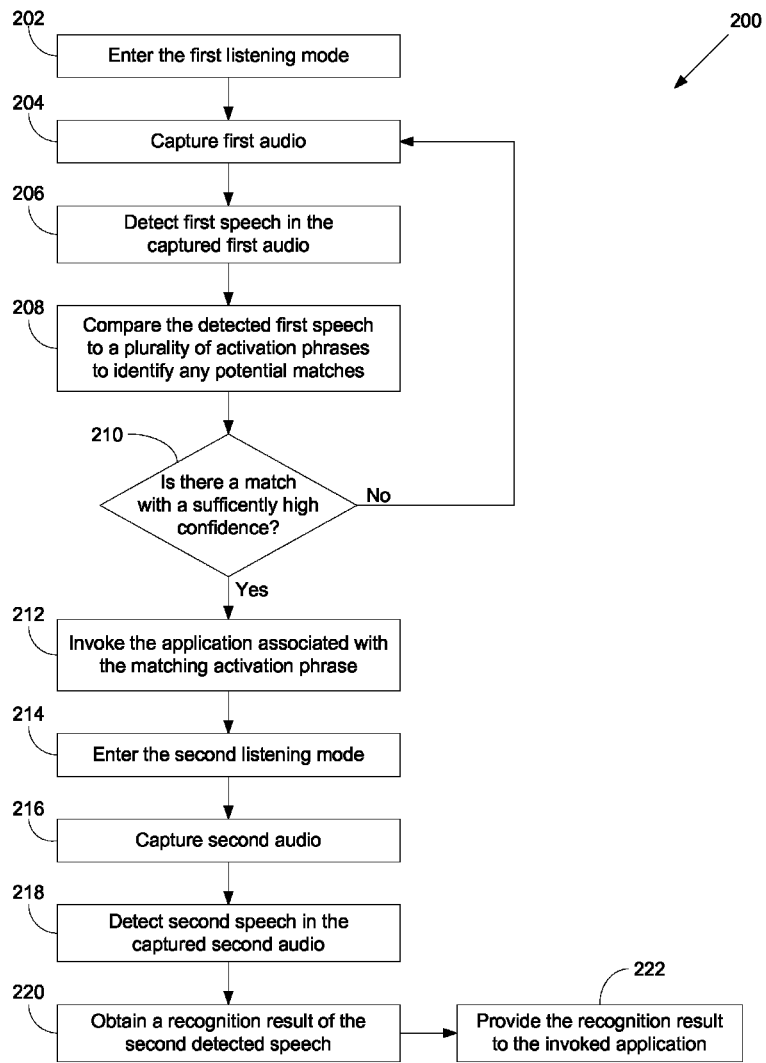
FIG. 2 is a flow chart of a method, in accordance with an example embodiment.

FIG. 2 is a flow chart illustrating an example method 200. For purposes of illustration, method 200 is explained with reference to the computing device 100 shown in FIG. 1. It is to be understood, however, that other types of computing devices could be used.

Method 200 may begin when the computing device enters the first speech detection mode, as indicated by block 202. In some cases, the computing device is configured to operate in the first speech detection mode continuously or by default. Thus, the computing device may enter the first speech detection mode when the computing device powers up. In other cases, however, the computing device enters the first speech detection mode in response to detecting a trigger, such as detecting that the computing device is docked or is being powered externally, detecting an asynchronous communication (e.g. an incoming text message, voice mail message or e-mail message), or detecting a manual actuation by the user (e.g., detecting that the user has pressed a particular button, a selected a particular icon displayed on display 104, or has performed some other predefined interaction with input interface 106).

In the first speech detection mode, the computing device captures first audio (e.g., using audio recorder 120), as indicated by block 204. At some point, first speech is detected in the captured first audio, as indicated by block 206. The speech detection could be performed, for example, by speech detector 122.

In response to detecting speech in the captured audio, the detected first speech is compared to a plurality of activation phrases to identify any potential matches, as indicated by block 208. The comparison could be based on a first language model, such as a language model that is built from the set of activation phrases. For example, the comparison could be made by speech recognizer 124, as part of its speech recognition function, using the first language model. As noted above, each activation phrases may include one or more words and may be associated with one of application(s) 130. The activation phrases could be stored in data storage 112 and accessed by speech recognizer 124 during the first speech detection mode. In some cases, the activation phrases may by customizable by the user.

How long the computing device remains in the first speech detection mode may depend on whether speech recognizer 124 identifies a matching activation phrase with a sufficiently high confidence, as indicated by block 210. For example, when speech recognizer 124 finds a potential match, the speech recognizer 124 may also determine a confidence level for the potential match. If the confidence level for the potential match exceeds (or is equal to) a predetermined confidence threshold, then the match may be deemed to have a sufficiently high confidence that speech recognizer 124 forwards the matching activation phrase to application launcher 128. If, however, the confidence level for the potential match is less than the predetermined confidence threshold, then the computing device continues to capture audio for the first speech detection mode (block 204).

As noted above, if there is a match with a sufficiently high confidence, then speech recognizer 124 may forward the matching activation phrase to application launcher 128. In response, application launcher 128 may invoke the application associated with the matching activation phrase (i.e., one of application(s) 130), as indicated by block 212. In addition, the computing device may enter the second speech detection mode, as indicated by block 214. This may involve, for example, the invoked application causing speech recognizer 124 to operate in its second mode so as to listen for speech input related to the invoked application.

During the second speech detection mode, the computing device may receive speech input for the invoked application. For example, the computing device may capture second audio, as indicated by block 216, and detect second speech in the captured second audio, as indicated by block 218. The computing device may then obtain a recognition result of the second detected speech, as indicated by block 220. The recognition result could be provided by speech recognizer 124, using a second language model that is less restricted than the first language model. For example, the first language model used by speech recognizer 124 in the first speech detection mode might cover only the activation phrases that are supported by the computing device, whereas the second language model used by speech recognizer 124 in the second speech detection mode might be a wide coverage language model that can recognize a wider range of utterances.

Once the computing device has obtained the recognition result, the recognition result can be provided (e.g., by speech recognizer 124) to the invoked application, as indicated by block 222. In some embodiments, the recognition result is provided to the invoked application only when there is a sufficiently high confidence in the recognition result. For example, when speech recognizer 124 obtains the recognition result, speech recognizer 124 may also determine a confidence of the recognition result and compare the confidence to a predetermined threshold confidence. If the confidence exceeds the threshold confidence, then speech recognizer 124 may provide the recognition result to the invoked activation. If the confidence is less than the threshold confidence, then the computing device could seek additional input from the user or could send the detected second speech to a network speech recognizer (e.g., through speech client 126) to try to obtain a better recognition result. The predetermined threshold confidence used in the second speech detection mode could be lower than the predetermined threshold confidence used in the first speech detection mode.

While method 200 has been described in relation to speech recognition being performed by speech recognizer 124 that is internal to computing device 100, it is to be understood that some or all of the speech recognition could be performed by a network speech recognizer that is in communication with computing device 100. For example, speech recognition in the first speech detection mode could be performed by speech recognizer 124, and speech recognition in the second speech detection mode could be performed by a network speech recognizer. In some examples, speech recognition could be performed in parallel by speech recognizer 124 and by the network speech recognizer. Other examples are also possible.

The speech input for the invoked application may occur in phases. For example, if the matching activation phrase is "Messages," then a text message application may be invoked. The text message application may cause a set of options for further action to be visually displayed on display 104 (speech prompts may also be provided). The options could be, for example, "New Message," "Reply To," "Read Last," "Read All," and "Show Last." The user may then provide speech input to select one of these options. For example, the user may speak "New Message." Speech recognizer 124, operating in its second mode, may recognize this input and forward the speech recognition result to the text message application in application(s) 130. In response, the text message application may display an indication that the "To" field (the message recipient) needs to be populated and may display possible recipients from the user's contact list. The user may then provide speech input, such as "Bob Smith," to select one of the possible recipients. Next, the text message application may display an indication that a message body should be composed. The user may do so with further speech input and then provide a voice command to send the message. At some point, the user may dismiss the text message application, for example, using a voice command or a manual actuation. In response, the computing device may go back into the first speech detection mode.

4. Non-Transitory Computer Readable Medium

Some or all of the functions described above and illustrated in FIG. 2 may be performed by a computing device (such as computing device 100 shown in FIG. 1) in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for a computing device, the method comprising:

during a first speech detection mode, the computing device:
capturing first audio,
detecting first speech in the captured first audio,
comparing the detected first speech to a plurality of activation phrases to identify any potential matches based on a first language model, wherein the plurality of activation phrases is associated with a plurality of applications on the computing device such that each application in the plurality of applications is associated with a respective activation phrase in the plurality of activation phrases, and wherein the first language model covers the plurality of activation phrases, and
in response to identifying a matching activation phrase within a confidence threshold, invoking the application in the plurality of applications associated with the matching activation phrase and entering a second speech detection mode; and during the second speech detection mode, the computing device:
in response to entering the second speech detection mode, reducing the confidence threshold,
capturing second audio,
detecting second speech in the captured second audio, obtaining a recognition result of the detected second speech based on a second language model, wherein the second language model has a wider coverage than the first language model, determining whether the recognition result is identified within the confidence threshold, and after determining that the recognition result is identified within the confidence threshold, providing the recognition result to the invoked application.

2. The method of claim 1, further comprising:
the computing device detecting a trigger; and
the computing device entering the first speech detection mode in response to the detected trigger.

3. The method of claim 2, wherein the computing device detecting a trigger comprises the computing device detecting that the computing device is docked.

4. The method of claim 2, wherein the computing device detecting a trigger comprises the computing device detecting that the computing device is being powered by an external source.

5. The method of claim 2, wherein the computing device detecting a trigger comprises the computing device detecting that the computing device has received an asynchronous communication.

6. The method of claim 2, wherein the computing device detecting a trigger comprises the computing device detecting a manual actuation on the computing device.

7. The method of claim 1, further comprising:
during the second speech detection mode, the computing device visually displaying a plurality of options based on the invoked application, wherein each option is associated with a respective action.

8. The method of claim 7, further comprising:
determining that the recognition result selects one of the displayed options; and
the computing device initiating the action associated with the selected option.

9. The method of claim 1, wherein identifying a matching activation phrase within the confidence threshold comprises:
determining that the detected first speech matches the matching activation phrase with a confidence that exceeds a first confidence threshold.

10. The method of claim 9, further comprising:
determining a confidence of the recognition result; and
determining that the confidence of the recognition result exceeds a second threshold confidence threshold.

11. The method of claim 9, wherein the first confidence threshold is higher than the second confidence threshold.

12. The method of claim 1, wherein comparing the detected first speech to a plurality of activation phrases to identify any potential matches based on a first language model comprises using a speech recognizer with the first language model, wherein the speech recognizer is internal to the computing device.

13. The method of claim 12, wherein obtaining a recognition result of the detected second speech based on a second language model comprises obtaining the recognition result from a network speech recognizer that is configured to use the second language model, wherein the network speech recognizer is in communication with the computing device.

14. A non-transitory computer readable medium having stored therein instructions executable by at least one processor to cause a computing device to perform functions, the functions comprising:
during a first speech detection mode:
capturing first audio,
detecting first speech in the captured first audio,
comparing the detected first speech to a plurality of activation phrases to identify any potential matches based on a first language model, wherein the plurality of activation phrases is associated with a plurality of applications on the computing device such that each application in the plurality of applications is associated with a respective activation phrase in the plurality of activation phrases, and wherein the first language model covers the plurality of activation phrases, and
in response to identifying a matching activation phrase within a confidence threshold, invoking the application in the plurality of applications associated with the matching activation phrase and entering a second speech detection mode; and
during the second speech detection mode:
in response to entering the second speech detection mode, reducing the confidence threshold,
capturing second audio,
detecting second speech in the captured second audio,
obtaining a recognition result of the detected second speech based on a second language model, wherein the second language model has a wider coverage than the first language model,
determining whether the recognition result is identified within the confidence threshold, and
after determining that the recognition result is identified within the confidence threshold, providing the recognition result to the invoked application.

15. The non-transitory computer readable medium of claim 14, wherein the functions further comprise:
detecting a trigger; and
entering the first speech detection mode in response to detecting the trigger.

16. The non-transitory computer readable medium of claim 14, wherein the functions further comprise:
during the second speech detection mode, visually displaying a plurality of options based on the invoked application.

17. A computing device, comprising:
at least one processor;
data storage;
instructions stored in the data storage, wherein the instructions are executable by the at least one processor to cause the computing device to perform functions, the functions comprising:
capturing first audio;
detecting first speech in the captured first audio;
comparing the detected first speech to a plurality of activation phrases to identify any potential matches based on a first language model, wherein the plurality of activation phrases is associated with a plurality of applications on the computing device such that each application in the plurality of applications is associated with a respective activation phrase in the plurality of activation phrases, and wherein the first language model covers the plurality of activation phrases;
in response to identifying a matching activation phrase within a confidence threshold, invoking the application in the plurality of applications associated with the matching activation phrase and entering a second speech detection mode;
in response to entering the second speech detection mode, reducing the confidence threshold;
capturing second audio;
detecting second speech in the captured second audio;

obtaining a recognition result of the detected second speech based on a second language model, wherein the second language model has a wider coverage than the first language model;

determining whether the recognition result is identified within the confidence threshold; and after determining that the recognition result is identified within the confidence threshold, providing the recognition result to the invoked application.

18. The computing device of claim 17, further comprising a display, wherein the functions further comprise displaying on the display a plurality of options based on the invoked application, wherein each option is associated with a respective action.

19. The computing device of claim 18, wherein the functions further comprise:

determining that the recognition result selects one of the displayed options; and initiating the action associated with the selected option.

20. The computing device of claim 18, wherein the invoked application is configured to populate an input field on the display based on the recognition result.

* * * * *